United States Patent [19]
Hara

[11] Patent Number: 5,822,474
[45] Date of Patent: Oct. 13, 1998

[54] OPTICAL BRANCHING APPARATUS AND TRANSMISSION LINE SETTING METHOD THEREFOR

[75] Inventor: Yasushi Hara, Tokyo, Japan

[73] Assignee: NEC Corporation, Tokyo, Japan

[21] Appl. No.: 693,705

[22] Filed: Aug. 7, 1996

[30] Foreign Application Priority Data

Aug. 21, 1995 [JP] Japan .................................. 7-211734

[51] Int. Cl.$^6$ .................................................. G02B 6/28
[52] U.S. Cl. ................................ 385/24; 385/31; 385/46; 359/115
[58] Field of Search .................................. 385/24, 15, 16, 385/17, 20, 31, 46; 359/124, 115, 117, 128, 139

[56] References Cited

U.S. PATENT DOCUMENTS

| 5,194,977 | 3/1993 | Nishio ..................................... 359/128 |
| 5,627,925 | 5/1997 | Alferness et al. ..................... 385/24 X |
| 5,675,676 | 10/1997 | Yamashita et al. ....................... 385/24 |

FOREIGN PATENT DOCUMENTS 2-93436  4/1990  Japan .
5-63655  3/1993  Japan .

Primary Examiner—Phan T. H. Palmer
Attorney, Agent, or Firm—Young & Thompson

[57] ABSTRACT

An optical branching apparatus for branching optical transmission lines as reverse and forward links through a plurality of ports includes a plurality of demultiplexing units, a plurality of multiplexing units, and a plurality of optical transmission media. Each of the plurality of demultiplexing unit is arranged in each of the ports to demultiplex a light beam input from the optical transmission line in accordance with one of a wavelength and a wavelength band. Each of the plurality of multiplexing units is arranged in the each port to multiplex light beams having different wavelengths or wavelength bands demultiplexed by the demultiplexing units of remaining ports and outputs a multiplexed light beam to the optical transmission line. One of the wavelength and the wavelength band is determined in accordance with a combination of an optical transmission source and an optical transmission destination. Each of the plurality of optical transmission media connects the each demultiplexing unit to at least one of the multiplexing units of the remaining ports to perform optical transmission.

10 Claims, 4 Drawing Sheets

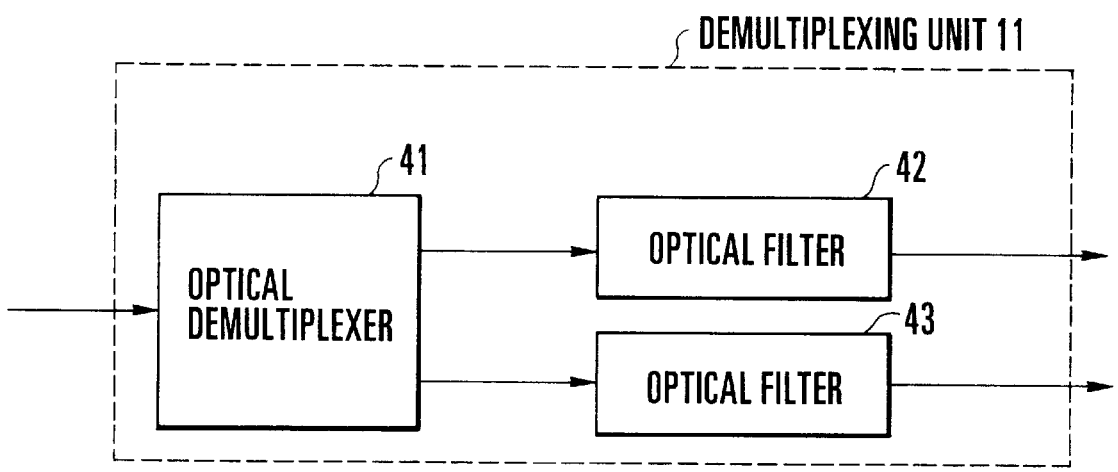
F I G. 2

OPTICAL BRANCHING APPARATUS AND TRANSMISSION LINE SETTING METHOD THEREFOR

BACKGROUND OF THE INVENTION

The present invention relates to an optical branching circuit having at least three ports and a transmission line setting method therefor and, more particularly, to an optical branching circuit and a transmission line setting method therefor, in which the number of communication optical fibers of a transmission line connected to each port can be minimized.

In branching one port P1 into two ports P2 and P3 in a conventional optical branching circuit, a light beam received from the optical fiber connected to the port 1 is output to the port P2 or P3 in accordance with a destination. Light beams received from the ports P2 and P3 are output to the port P1.

A relay system such as an optical fiber submarine cable has the limited number of optical fibers. Optical fibers must be branched and connected within the number of optical fibers constituting the submarine cable.

As shown in FIG. 4, when a conventional optical branching apparatus 9 of this type has three ports, i.e., ports P1 to P3, pairs of optical fibers 91, 92, and 93 each pair constituting reverse and forward links are connected between the ports P1 and P2, between the ports P2 and P3, and between the ports P1 and P3, respectively.

More specifically, an input terminal I12 and an output terminal O21 of the port P1 are connected to an output terminal O12 and an input terminal I21 of the port P1 through the pair of optical fibers 91, respectively. An input terminal I13 and an output terminal O31 of the port P1 are connected to an output terminal O31 and an input terminal I31 of the port P3 through the pair of optical fibers 93, respectively. An input terminal I23 and an output terminal O32 of the port P2 are connected to an output terminal O23 and an input terminal I32 of the port P3 through the pair of optical fibers 92, respectively.

With this arrangement, the pairs of two-way optical fibers 91 to 93 connected between the corresponding port pairs can transmit and relay multiplexed light beams having arbitrary combinations of wavelengths falling within the use range. For this reason, according to a transmission line setting method, the wavelengths of light beams output from the pairs of optical fibers 91 to 93 have only limitations depending on transmission systems in stations which terminate the cables.

The conventional optical branching circuit described above has a characteristic feature in the transmission line setting method such that the station which terminates a cable fixes a destination station for each optical fiber, and the wavelengths of light beams input to and output from the optical fibers are limited by only the transmission systems because the pairs of optical fibers 91 to 93 are connected between the corresponding port pairs. However, when the number of ports to be branched by the relay system of the submarine cable having the limited number of optical fibers, the number of optical fibers becomes short.

SUMMARY OF THE INVENTION

It is an object of the present invention to provide an optical branching apparatus and a transmission line setting method therefor, in which the number of communication optical fibers connected between a plurality of ports can be minimized.

In order to achieve the above object of the present invention, there is provided an optical branching apparatus for branching optical transmission lines as reverse and forward links through a plurality of ports, comprising a plurality of demultiplexing means, each arranged in each of the ports, each for demultiplexing a light beam input from the optical transmission line in accordance with one of a wavelength and a wavelength band, a plurality of multiplexing means, each arranged in the each port, each for multiplexing light beams having different wavelengths or wavelength bands demultiplexed by the demultiplexing means of remaining ports and outputting a multiplexed light beam to the optical transmission line, one of the wavelength and the wavelength band being determined in accordance with a combination of an optical transmission source and an optical transmission destination, and a plurality of optical transmission media, each for connecting each demultiplexing means to at least one of the multiplexing means of the remaining ports to perform optical transmission.

BRIEF DESCRIPTION OF THE DRAWINGS

FIG. 2 is a block diagram showing another arrangement of a demultiplexing unit shown in FIG. 1;

DESCRIPTION OF THE PREFERRED EMBODIMENTS

The preferred embodiments of the present invention will be described with reference to the accompanying drawings. Optical fibers are used as optical transmission media. Optical wavelength demultiplexing is not limited to a specific means, but can have any structure, arrangement, and method.

Figure 1:
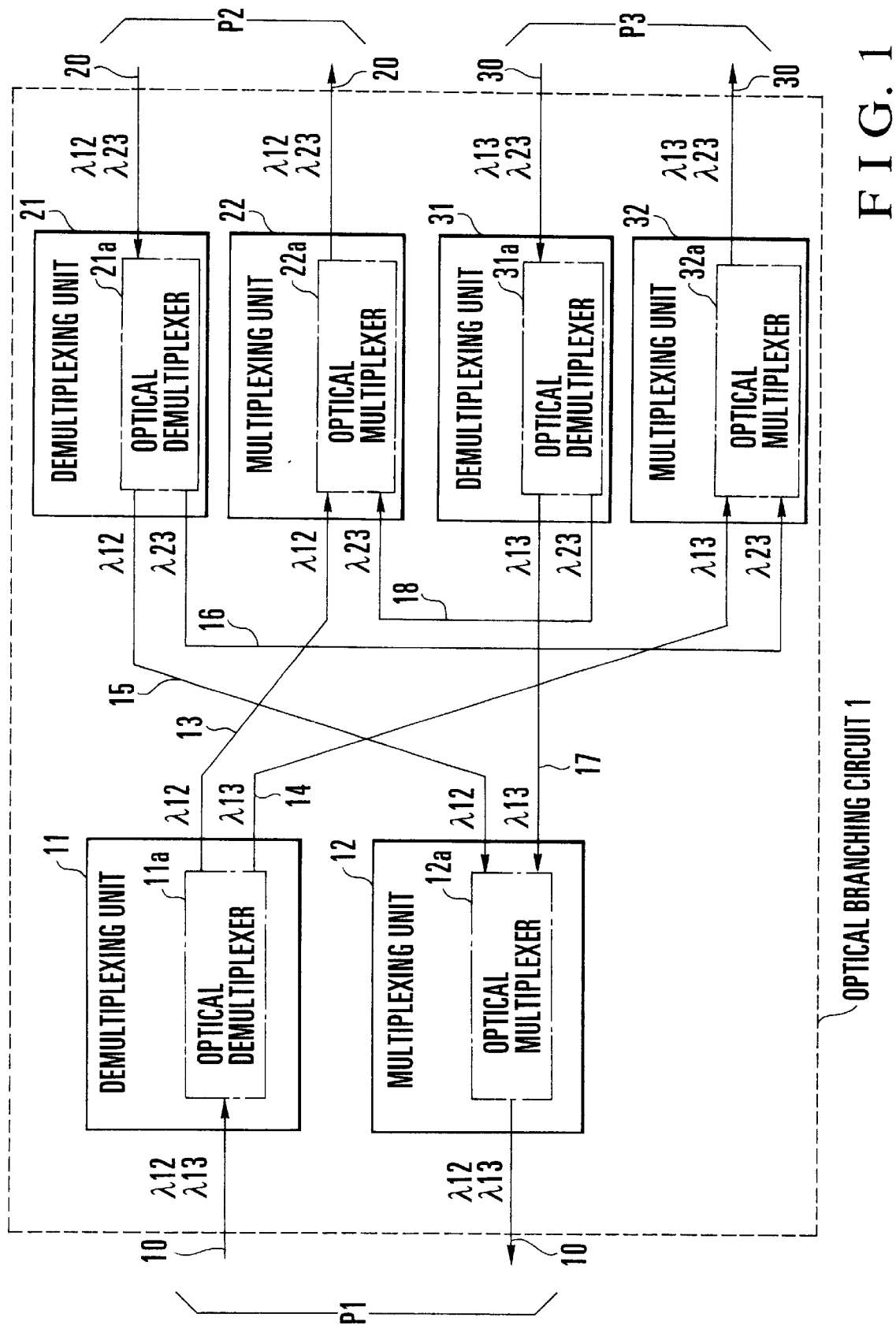
FIG. 1 is a block diagram showing an optical branching circuit according to the first embodiment of the present invention.

FIG. 1 shows an optical branching circuit according to the first embodiment of the present invention. An optical branching circuit 1 shown in FIG. 1 has demultiplexing units 11, 21, and 31 having optical demultiplexers 11a, 21a, and 31a, and multiplexing units 12, 22, and 32 having optical multiplexers 12a, 22a, and 32a for ports P1 to P3. In the optical branching circuit 1, the demultiplexing unit 11 of the port P1 is connected to the multiplexing unit 22 of the port P2 and the multiplexing unit 32 of the port P3 through optical fibers 13 and 14. Similarly, the demultiplexing units 21 and 31 of the ports P2 and P3 are connected to the multiplexing units 12 and 32 of the ports P1 and P3, and the multiplexing units 12 and 22 of the ports P1 and P2 through optical fibers 15 to 18, respectively. The ports P1, P2, and P3 are connected to stations (not shown) through pairs of optical fibers 10, 20, and 30, each pair serving as the reverse and forward links.

A light beam having wavelengths $\lambda12$ and $\lambda13$ incident on the input terminal of the port P1 is demultiplexed into wavelength components by the optical demultiplexer 11a of the demultiplexing unit 11. The light beam having the wavelength $\lambda12$ is output to the multiplexing unit 22 of the port P2 through the optical fiber 13, while the light beam having the wavelength $\lambda13$ is output to the multiplexing unit 32 of the port P3 through the optical fiber 14. Similarly, a light beam having the wavelength λ12 and a wavelength λ23 incident on the input terminal of the port P2 is demultiplexed into wavelength components by the optical demultiplexer 21a of the demultiplexing unit 21. The light beam having the wavelength λ12 is output to the multiplexing unit 12 of the port P1 through the optical fiber 15, while the light beam having the wavelength λ23 is output to the multiplexing unit 32 of the port P3 through the optical fiber 16. Similarly, a light beam having the wavelength λ13 and λ23 incident on the input terminal of the port P3 is demultiplexed into wavelength components by the optical demultiplexer 31a of the demultiplexing unit 31. The light beam having the wavelength λ13 is output to the multiplexing unit 12 of the port P1 through the optical fiber 17, while the light beam having the wavelength λ23 is output to the multiplexing unit 22 of the port P2 through the optical fiber 18.

The optical multiplexers 12a, 22a, and 32a of the multiplexing units 12, 22, and 32 multiplex input wavelength components and output light beams having the wavelengths λ12 and λ13, the wavelengths λ12 and λ23, and the wavelengths λ13 and λ23 to the output terminals of the ports P1 to P3, respectively.

In the optical branching circuit having this arrangement, each of the demultiplexing units 11, 21, and 31 is connected to a corresponding one of the multiplexing units 12, 22, and 32 through a corresponding one of the optical fibers 13 to 18. A light beam having a given wavelength is exchanged between corresponding two of the ports P1 to P3, thereby obtaining a simple, compact arrangement and facilitating the transmission line setting method.

Since each of the demultiplexing units 11, 21, and 31 is connected to a corresponding one of the multiplexing units 12, 22, and 32 through a corresponding one of the optical fibers 13 to 18, two-way communications can be made between the corresponding two of the ports P1 to P3. However, the connections between the ports P2 and P3 through the optical fibers 16 and 18 may be omitted, and the number of routes may be limited to two, e.g., between the ports P1 and P2 and between the ports P1 and P3, thereby arranging a simpler circuit having a specific application purpose.

FIG. 1 exemplifies the three ports P1 to P3. However, the present invention is also applicable to an arrangement having four or more ports, as a matter of course.

FIG. 2 shows another arrangement of the demultiplexing unit 11. This arrangement comprises an optical demultiplexer 41 for demultiplexing a light beam having a plurality of wavelengths and incident from one terminal into wavelength components, and a plurality of optical filters 42 and 43 for transmitting the demultiplexed light beam components in units of wavelengths. In this manner, the multiplexing unit can be simplified.

Although not shown, still another demultiplexing example is a WDM (Wavelength Division Multiplex) coupler used in the WDM scheme defined as one of the techniques for transmitting a multiplexed light beam having different wavelengths.

Figure 3:
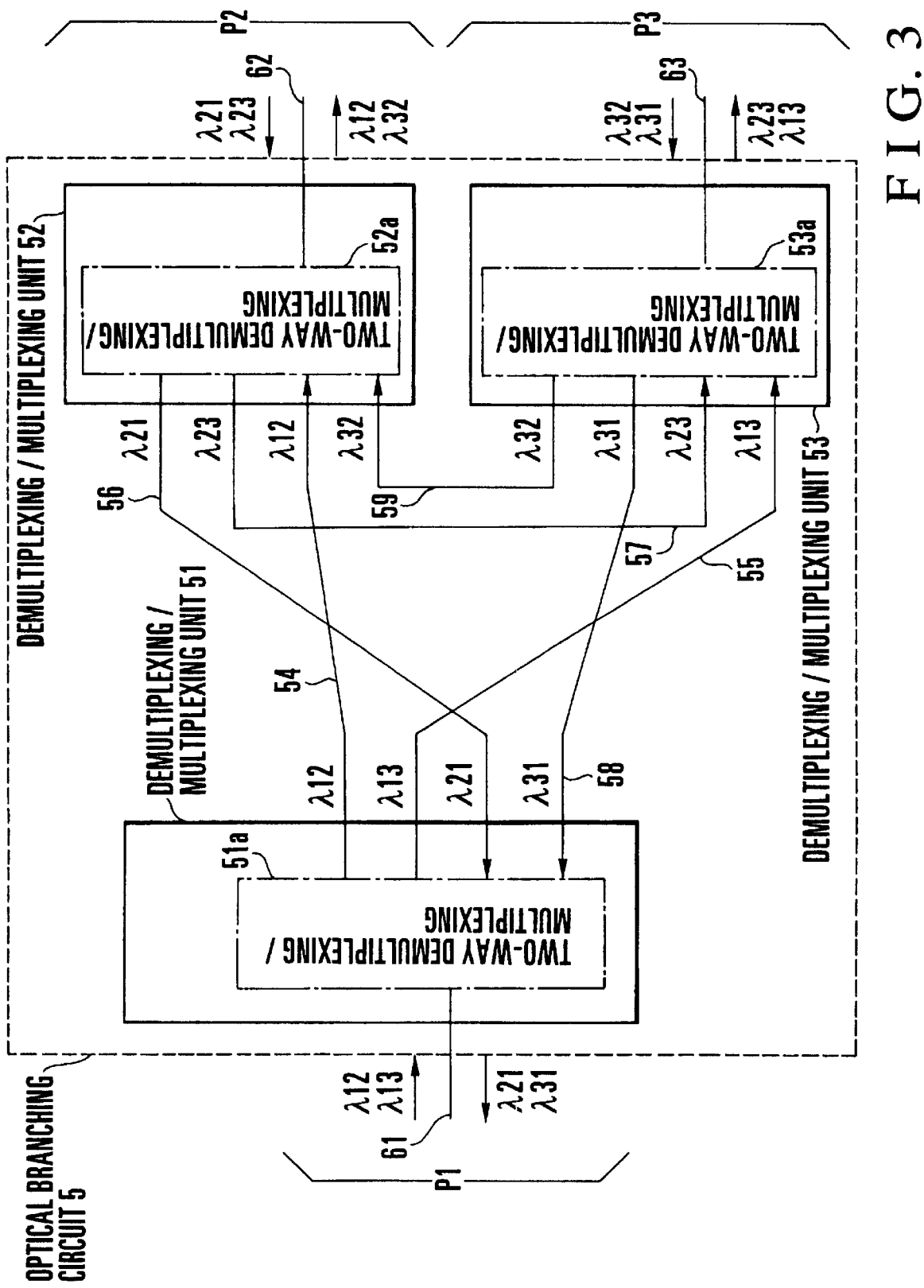
FIG. 3 is a block diagram showing an optical branching circuit according to the second embodiment of the present invention.
Figure 4:
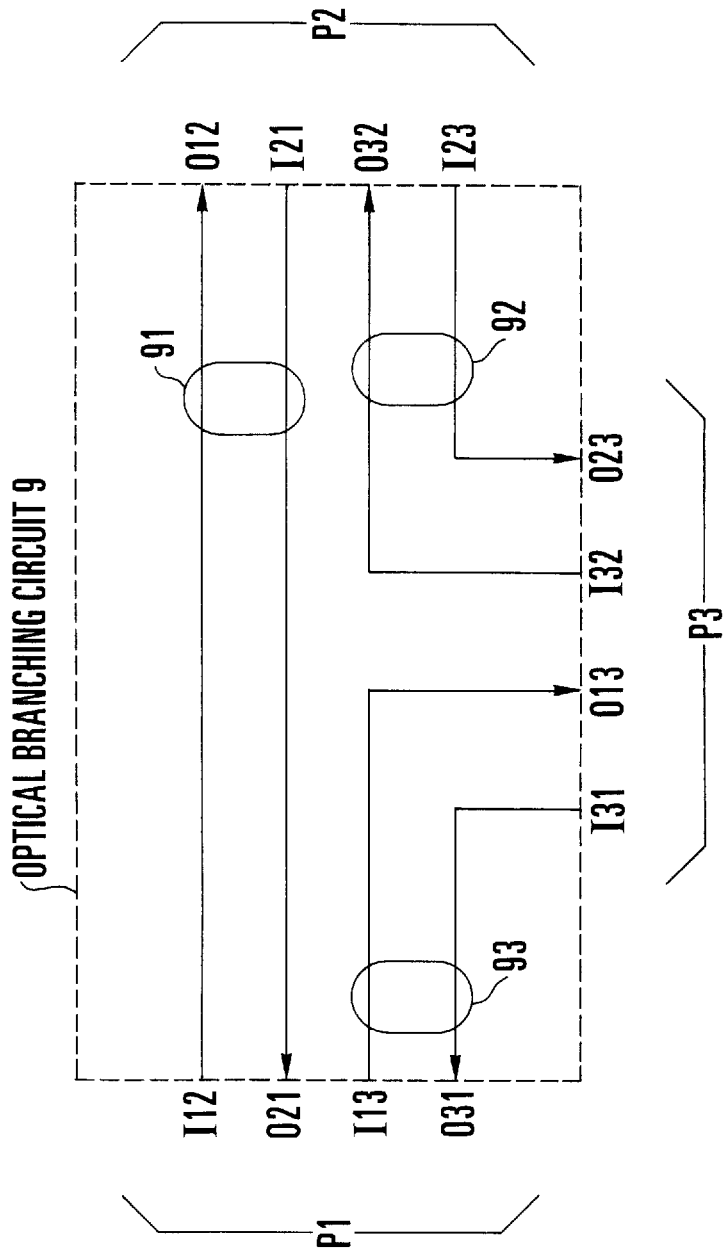
FIG. 4 is a block diagram showing a conventional optical branching circuit.

FIG. 3 shows an optical branching circuit according to the second embodiment of the present invention. An optical branching circuit 5 connected to external optical fibers 61 to 63 for transmitting two-way light beams each having different wavelengths multiplexed by the WDM scheme will be described below.

Communication partners are preset for three ports P1 to P3 of this optical branching circuit 5 in accordance with the magnitudes of wavelengths. In the optical branching circuit 5, light beams having six wavelengths λ12, λ13, λ21, λ23, λ31, and λ32 are transmitted as follows. A light beam having the wavelength λ12 is transmitted from the port P1 to P2 through an optical fiber 54. A light beam having the wavelength λ13 is transmitted from the port P1 to the port P3 through an optical fiber 55. A light beam having the wavelength λ21 is transmitted from the port P2 to the port P1 through an optical fiber 56. A light beam having the wavelength λ23 is transmitted from the port P2 to the port P3 through an optical fiber 57. A light beam having the wavelength λ31 is transmitted from the port P3 to the port P1 through an optical fiber 58. A light beam having the wavelength λ32 is transmitted from the port P3 to the port P2 through an optical fiber 59.

As shown in FIG. 3, the optical branching circuit 5 has demultiplexing/multiplexing units 51, 52, and 53 respectively for the ports P1 to P3. The demultiplexing/multiplexing units 51, 52, and 53 have two-way demultiplexers/multiplexers 51a, 52a, and 53a. The two-way demultiplexer/multiplexer 51a of the demultiplexing/multiplexing unit 51 receives a light beam having the wavelengths λ12 and λ13 from the external optical fiber 61 connected to the input/output terminal of the port P1, and outputs the light beam having the wavelength λ12 to the two-way demultiplexer/multiplexer 52a of the demultiplexing/multiplexing unit 52 of the port P2 through the optical fiber 54 and the light beam having the wavelength λ13 to the two-way demultiplexer/multiplexer 53a of the demultiplexing/multiplexing unit 53 of the port P3 through the optical fiber 55. The two-way demultiplexer/multiplexer 51a of the demultiplexing/multiplexing unit 51 multiplexes the light beam having the wavelength λ21 and received from the demultiplexer/multiplexer 52a of the demultiplexing/multiplexing unit 52 of the port P2 through the optical fiber 56 and the light beam having the wavelength λ31 and received from the demultiplexer/multiplexer 53a of the demultiplexing/multiplexing unit 53 of the port P3 through the optical fiber 58, and outputs the multiplexed light beam to the external optical fiber 61 connected to the input/output terminal of the port P1.

Similarly, the demultiplexing/multiplexing unit 52 of the port P2 receives a light beam having the wavelengths λ21 and λ23 from the input/output terminal and demultiplexes the input light beam. The unit 52 outputs the light beam having the wavelength λ21 to the demultiplexing/multiplexing unit 51 of the port P1 and the light beam having the wavelength λ23 to the demultiplexer/multiplexer 53a of the demultiplexing/multiplexing unit 53 of the port P3 through the optical fiber 57. The unit 52 multiplexes the light beam having the wavelength λ12 and received from the demultiplexing/multiplexing unit 51 of the prot P1 and the light beam having the wavelength λ32 and received from the demultiplexer/multiplexer 53a of the demultiplexing/multiplexing unit 53 through the optical fiber 59. The unit 52 outputs the multiplexed light beam to the input/output terminal through the optical fiber 62. The demultiplexing/multiplexing unit 53 is operated in the same manner as described above, and a detailed description thereof will be omitted.

FIG. 3 exemplifies the three ports P1 to P3. The present invention is also applicable to an arrangement having four or more ports, as a matter of course.

In the above embodiment, optical wavelength selection and demultiplexing are performed in units of wavelengths different from each other. Only a light beam having a single wavelength is transmitted to an internal optical fiber in the optical branching circuit 5. In wavelength multiplex transmission between two ports, the number of optical fibers corresponds to the number of multiplexed wavelengths. In the arrangement of the optical demultiplexer in the optical branching circuit 5, however, when a plurality of outputs from the optical demultiplexer do not have single wavelengths but wavelength bands each having a plurality of wavelengths, the wavelengths can be replaced with the wavelength bands. In this case, the number of internal wiring optical fibers in the optical branching circuit 5 can be minimized. An optical demultiplexer having this function may be incorporated in the present invention.

As has been described above, according to the present invention, there is provided an optical branching circuit comprising, in each port, a demultiplexing means for demultiplexing a light beam incident from one input terminal into different wavelength components and a multiplexing means for receiving light beams having different wavelengths and outputting the multiplexed light beam to the output terminal, and comprising optical transmission media such as optical fibers for transmitting the light beams demultiplexed by the demultiplexing means to predetermined multiplexing means, respectively. With this arrangement, the installation number of external optical transmission media can be reduced to a pair for each port.

According to a transmission line setting method is obtained for an optical branching circuit, a station for connecting a pair of external transmission lines to the input/output terminal of each port presets light beams having different wavelengths for the respective stations of the respective destination ports, and at the same time, light beams having the same wavelength are used for the reverse and forward links in the transmission line of a given partner station. By this method, the optical setting conditions of each station can be simplified.

There is also provided an optical branching circuit having demultiplexing/multiplexing means arranged for the respective ports, and optical transmission media for connecting paths between predetermined demultiplexing/multiplexing means. Each demultiplexing/multiplexing means has one input/output terminal for an external device, demultiplexes a light beam input from this input/output terminal into wavelength components which are then output to predetermined optical transmission media, and at the same time, multiplexes light beams having different wavelengths received from optical transmission media and outputs the multiplexed light beam to the input/output terminal. With this arrangement, the installation number of external optical transmission media can be reduced to one.

According to one transmission line setting method based on this means, a station for connecting the external transmission line outside the optical branching circuit presets light beams having different wavelengths for the transmission lines between the stations of the respective destination ports. Therefore, station transmission line setting can be simplified.

What is claimed is:

1. An optical branching apparatus for branching optical transmission lines as reverse and forward links through a plurality of ports, comprising:

a plurality of demultiplexing means, each arranged in each of said ports, each for demultiplexing a light beam input from said optical transmission line in accordance with one of a wavelength and a wavelength band;

a plurality of multiplexing means, each arranged in said each port, each for multiplexing light beams having pre-selected wavelengths or wavelength bands demultiplexed by said demultiplexing means of remaining ports and outputting a multiplexed light beam to said optical transmission line, wherein each one of the wavelength and the wavelength band having been pre-selected in accordance with a combination of an optical transmission source and an optical transmission destination; and a plurality of optical transmission media, each for connecting said each demultiplexing means to at least one of said multiplexing means of the remaining ports to perform optical transmission of said preselected one of a wavelength and a wavelength band.

2. An apparatus according to claim 1, wherein said each demultiplexing means comprises an optical demultiplexer for demultiplexing the light beam input from said optical transmission line into wavelength components and outputting demultiplexed light beams, and said each multiplexing means comprises an optical multiplexer for multiplexing light beams from optical demultiplexers of the remaining ports.

3. An apparatus according to claim 2, wherein said each multiplexing means comprises a plurality of optical filters for adjusting the wavelengths of the light beams output from said demultiplexer into predetermined wavelengths and outputting resultant light beams.

4. An apparatus according to claim 2, wherein said optical demultiplexer demultiplexes the light beam input from said optical transmission line into wavelength components and outputs the demultiplexed light beams, and said each optical transmission medium transmits light beams having single wavelengths output from said optical demultiplexer to optical multiplexers of the remaining ports.

5. An apparatus according to claim 1, wherein each of said optical transmission lines comprises an optical fiber for transmitting a light beam having different wavelengths multiplexed by a wavelength division multiplex (WDM) scheme, and said each demultiplexing means comprises a WDM optical demultiplexing coupler.

6. An apparatus according to claim 1, wherein each of said optical transmission lines comprises a two-way optical fiber for transmitting a light beam having different wavelengths multiplexed by a wavelength division multiplex (WDM) scheme, and each of said demultiplexing means and said multiplexing means comprises a two-way demultiplexer/multiplexer for demultiplexing the light beam from said optical fiber and outputting demultiplexed light beams to said optical transmission media and multiplexing light beams from said optical transmission media and outputting a multiplexed light beam to said optical fiber.

7. A transmission line setting method for an optical branching apparatus including a plurality of demultiplexing units each arranged in each of ports to which optical transmission lines as reverse and forward links are branched to demultiplex a light beam input from each of said optical transmission lines in accordance with wavelengths, a plurality of multiplexing units each arranged in said each port to multiplex light beams demultiplexed by demultiplexing units of remaining ports and outputting a multiplexed light beam to said each optical transmission line, and a plurality of optical transmission media for connecting said each demultiplexing unit to multiplexing units of the remaining ports, comprising the steps of:

setting a light beam having assigned wavelengths for each combination of an optical transmission source and an optical transmission destination; and using a light beam having a single wavelength for the reverse and forward links in communication with a given transmission partner.

8. An optical branching apparatus for efficiently directing multiplexed optical signals of plural wavelengths to desired destinations comprising:

N ports, each said port comprising a demultiplexing/multiplexing unit, N-1 output terminals and N-1 input terminals each said terminal for transmitting and receiving a light beam having a single wavelength respectively;

a plurality of optical transmission media for connecting each said unit through said input and output terminals with two optical pathways serving as forward and reverse links to each remaining said unit;

each said unit adapted for receiving a multiplexed optical signal and demultiplexing and outputting said signal as N-1 wavelengths through said forward links according to assigned wavelengths, each of said N-1 wavelengths to one of said other units; and each said unit adapted to receive said N-1 wavelengths from said other units through said forward links and multiplex and output said N-1 wavelengths to a destination on an optical cable.

9. An optical branching apparatus of claim 8, wherein each said unit is a two-way port, comprising a two-way demultiplexing/multiplexing unit receiving said multiplexed optical signal from a two-way optical cable operatively connected to said unit.

10. An optical branching apparatus of claim 9, comprising:

a first, second, and third two-way port;

said first two-way port adapted for receiving a first multiplexed optical signal and demultiplexing and outputting said signal as first wavelength and second wavelength signals;

said second two-way port adapted for receiving a second multiplexed optical signal and demultiplexing and outputting said signal as third wavelength and fourth wavelength signals;

said third two-way port for receiving a third multiplexed optical signal and demultiplexing and outputting said signal as fifth and sixth wavelength signals;

said first two-way port adapted to accept said third and fifth wavelength signals and for multiplexing and outputting said third and fifth wavelength signals to a first destination on said two-way cable;

said second two-way port adapted to accept said second and sixth wavelength signals and for multiplexing and outputting said second and sixth wavelength signals to a second destination on said two-way cable; and said third two-way port adapted to accept said first and fourth wavelength signals and for multiplexing and outputting said first and fourth wavelength signals to a third destination on said two-way cable, wherein each of said first through sixth wavelengths are unique.

* * * * *